April 20, 1926.  
C. H. SMITH  
COTTON CHOPPER  
Filed Dec. 20, 1924
1,581,404
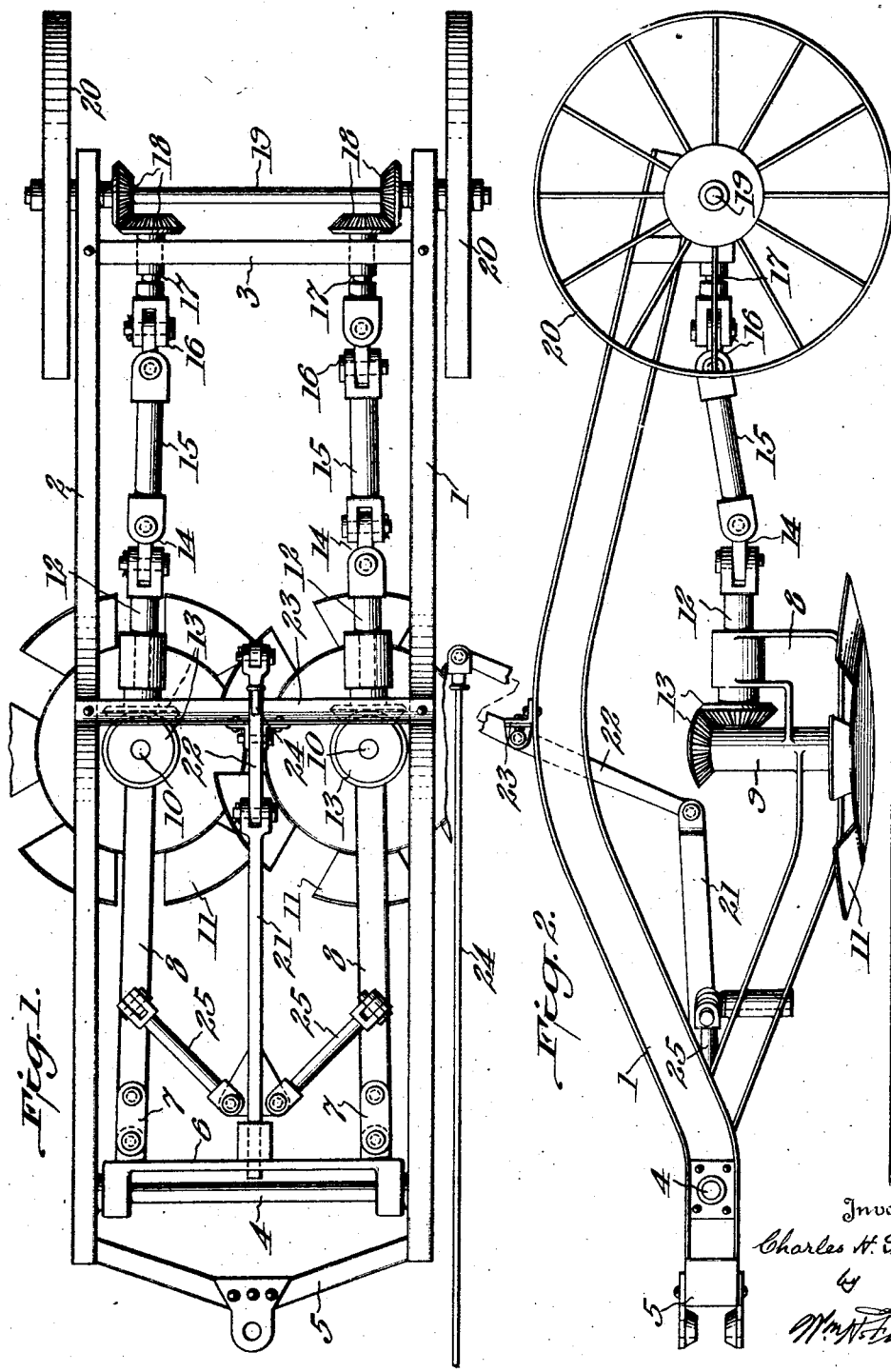

Patented Apr. 20, 1926.

1,581,404

UNITED STATES PATENT OFFICE.

CHARLES H. SMITH, OF MART, TEXAS.

COTTON CHOPPER.

Application filed December 20, 1924. Serial No. 757,179.

*To all whom it may concern:*

Be it known that I, CHARLES H. SMITH, a citizen of the United States, residing at Mart, in the county of McLennan and State of Texas, have invented a certain new and useful Improvement in Cotton Choppers, of which the following is a full, clear, and exact description.

The object of this invention is to provide a cotton chopper, which may be used as an attachment to a wheeled cultivator, although the machine of this invention may be built for separate use and not merely as an attachment.

The invention consist of chopping blades or cutters preferably mounted in pairs on frames hinged at the forward end of the machine and adapted to be raised and lowered and spread apart as the plants require, these blades or cutters being rotated in opposite directions by suitable gearing driven from the frame supporting shaft, as I will proceed now to explain and finally claim.

In the accompanying drawings illustrating the invention, in the several views of which like parts are similarly designated, Figure 1 is a top plan view, and Fig. 2 a side elevation illustrating one embodiment of the invention.

There is a main frame composed of the longitudinal members 1 and 2, connected at the rear by a cross piece 3, and at the front by a cross piece 4 or by a yoke 5 by which latter the machine may be attached to a cultivator. The longitudinal members 1 and 2 may be of arch form, as indicated in Fig. 2. In the instance shown, the cross piece 4 has pivoted to it a yoke 6, and this yoke has pivoted to it by links 7 the two frames 8 arranged below the members 1 and 2. These frames 8 have bearings 9 in which are arranged upright shafts 10, the lower ends of which support the cutters or blades 11, the cutting edges of the blades overlapping, more or less, so as to have a shear cut on the plants. These shafts 10 are geared with horizontal shafts 12 mounted in the frames 8 and the shafts 10 and 12 are shown as geared by bevel gears 13. The shafts 12 are connected by universal joints 14 with shafts 15 which in turn are connected by universal joints 16 with shafts 17 mounted in the cross piece 3, and these shafts 17 are connected by bevel gears 18 with the shaft or axle 19 mounted in the members 1 and 2 and serving to support the wheels 20. 21 is a bar slidably supported at one end on the yoke 6 and having its other end connected with a lever 22 which is pivoted on a bar 23 mounted on the members 1 and 2. This lever 22 extends up into convenient reach of the driver of the machine, if he be mounted on the attachment, or if the driver is mounted on the cultivator, then this lever may be extended by a rod 24 in convenient reach of the driver on the cultivator.

The bar 21 has mounted on it the pivoted links 25 which extend to the frames 8 so that by moving the lever 22 these frames may be slightly raised, lowered and spread so as to alter the positions of the cutters or blades 11 to suit the conditions of the planted field.

It will be observed that by the use of the universal or knuckle joints there is entire flexibility in the movement of parts, and the operator, therefore, has under perfect control the cutting mechanism at all stages of the progress of the machine through a field of plants.

The blades or cutters are set at an angle, and the cutting edges stand off from them at such relation to one another that the cutting edges of these blades or cutters have the desired shear cut.

The links 7 are articulated with the yoke 6 and also with the frames 8, and the yoke 6 is pivotally mounted upon the cross piece 4. The frames 8 are arranged in downwardly diverging planes as indicated by the tilt of the cutter or blade 11 in Fig. 2, and hence the combined motions of the pivoted yoke 6 and frames 8 under the action of the bar 21, lever 22 and links 25 effect the raising and lowering and lateral movements or spreading of the frames 8.

Variations in the details of construction and arrangement of parts are permissible within the principle of the invention and the scope of the claims following.

What I claim is:—

1. A cotton chopper, comprising a main frame and a wheeled support therefor, cutter supporting frames suspended at their front ends in the main frame, cutters mounted to rotate in said cutter supporting frames, articulated means geared to the wheeled support and the cutters for transmitting rotary motion to the cutters, and means for adjusting the cutter supporting frames and the cutters simultaneously away from and toward the longitudinal center of the machine.

2. A cotton chopper, comprising a main frame and a wheeled support therefor, individual cutter supporting frames movably mounted on the main frame at the end opposite the wheeled support, cutters mounted to rotate in said cutter supporting frames, means geared to the wheeled support and the cutters for transmitting rotary motion to the cutters, linkage interposed between the cutter supporting frames and the main frame, a lever, and jointed connections between said lever and the cutter supporting frames, whereby said frames may be moved laterally relatively to one another.

3. In a cotton chopper, a main frame having a wheeled support at one end and having its other end adapted for connection with a cultivator or other tractor, a yoke pivotally mounted on a transverse support at the end of the main frame opposite its wheeled support and capable of a rocking motion, two frames pivotally mounted on the yoke to move laterally and depending therefrom below and between the elements of the main frame, cutters mounted to rotate in said depending frames, flexible shafts mounted in the cutter carrying frames and extending thence rearwardly toward the wheeled support of the main frame, gearing connecting such flexible shafts with the wheeled support and the cutters, and means mounted on the main frame for adjusting the cutter carrying frames and the cutters thereon simultaneously away from and toward the longitudinal center of the machine.

4. A cotton chopper, comprising a main frame and a wheeled support therefor, a cross-piece in the main frame at its end opposite the wheeled support, a yoke pivotally mounted on said cross-piece, independent cutter supporting frames pivotally mounted on the yoke, cutters mounted to rotate in said cutter supporting frames, means geared to the wheeled support and the cutters for transmitting rotary motion to the cutters, a bar slidably supported at one end in said yoke, an operating lever pivotally connected to the other end of the bar and itself pivotally connected to the main frame, and links pivotally connected with said bar and the cutter supporting frames.

In testimony whereof I have hereunto set my hand this 11th day of December, A. D. 1924.

CHARLES H. SMITH.